United States Patent [19]
Kondo et al.

[11] Patent Number: 5,900,687
[45] Date of Patent: May 4, 1999

[54] CONNECTION CONFIGURATION FOR STATOR

[75] Inventors: Hideki Kondo, Yao; Seiji Kikuchi, Nishinomiya; Toshiyuki Tsuboi, Moriguchi; Toshihiro Takahata, Mino, all of Japan

[73] Assignee: Matsushita Electric Industrial Co., Ltd., Japan

[21] Appl. No.: 09/028,489

[22] Filed: Feb. 24, 1998

[30] Foreign Application Priority Data

Mar. 3, 1997 [JP] Japan .................................. 9-047527

[51] Int. Cl.⁶ ............................. H02K 11/00; H02K 3/46
[52] U.S. Cl. ................................................ 310/71; 310/260
[58] Field of Search ................................. 310/71, 67 R, 310/260, 254, 68 R, 257, 70 R, 70 A

[56] References Cited

FOREIGN PATENT DOCUMENTS 6-233483  8/1994  Japan .

OTHER PUBLICATIONS

Patent Abstracts of Japan; vol. 012, No. 167 (E–610), May 19, 1988 & JP 62 277041 A (Nippon Electric Ind Co Ltd), Dec. 1, 1987, *abstract*.
Patent Abstracts of Japan; vol. 018, No. 263 (E–1550), May 19, 1994 & JP 06 038429 A (Shinano Kenshi KK), Feb. 10, 1994, *abstract*.
Patent Abstracts of Japan; vol. 018, No. 210 (E–1537), Apr. 14, 1994 & JP 06 006950 A (Matsushita Seiko Co Ltd), Jan. 14, 1994, *abstract*.
Patent Abstracts of Japan; vol. 010, No. 141 (E–406), May 24, 1986 & JP 61 004430 A (Mitsubishi Denki KK), Jan. 10, 1986, *abstract*.

*Primary Examiner*—Nestor Ramirez
*Assistant Examiner*—Dang Dinh Le
*Attorney, Agent, or Firm*—Parkhurst & Wendel

[57] ABSTRACT

The present invention has an object of providing a rational connection configuration for an inner rotor type stator comprising coil windings provided for each pole blade. Accordingly, the connection configuration of the invention comprises three types of electric conductors corresponding to U-, V- and W-phases, respectively, and shaped like a ring. Each electric conductor has a projection extended in four directions corresponding to four groups of coil windings each of a same phase, and a lead representing each phase and extending outward of an outer diameter of the stator. The electric conductors and a common electric conductor are arranged on an end plate concentrically. Connections between the coil windings and the projections respectively of the same phase are radially arranged at places outward of the grooves of the end plate as to effect connection therebetween.

6 Claims, 4 Drawing Sheets

CONNECTION CONFIGURATION FOR STATOR

FIELD OF THE INVENTION

The present invention relates to a connection configuration for a stator used in rotary machines and more particularly, to a connection configuration for coil windings of an inner rotor type stator.

BACKGROUND OF THE INVENTION

Recent stators have separate coil windings for each pole blade for increasing the winding density. it is a general practice in the art to adopt a Y-configured connection for this type of stator in order to reduce circulating current occurred due to unbalance among individual coil windings.

As the Y-configured connection, it is known to use a connection in which some of the coil windings have one ends thereof bundled together with regard to a same phase and the other ends thereof bundled together with those of the other coil windings regardless of difference in phase, and then are subjected to a connecting process by means of soldering, brazing or the like; a connection utilizing a printed board provided with printed wiring; a connection utilizing a multi-layered copper-bar board; and the like. The connection utilizing the multi-layered copper-bar board comprises a conductive board connected to the ends of coil windings of the same phase and a conductive board connected to the other ends of the coil windings in common regardless of difference in phases with an insulating material interposed therebetween (see, for examples JP A 6-233483).

Unfortunatelye however, the aforementioned connection through soldering or brazing the bundles of coil winding ends is performed by manual work which requires a great amount of time and effort. In view of a current capacity of a copper foil, the connection utilizing the printed board is not suitable in general for a large size stator which requires high current flowing therethrough.

The connection utilizing the multi-layered copper-bar board is constructed such that conductive boards are laminated by way of interposing an insulating material therebetween, so that the overall dimensions tend to increase with respect to a direction in which the boards are laminated. In addition, the conductive board is formed by pressing a copper sheet, requiring a press machine and a die for each frame. Consequently, the equipment for preparing this type of connection is complicated and large on scale.

DISCLOSURE OF THE INVENTION

In view of the foregoing, it is an object of the present invention to provide a rational connection configuration for an inner rotor type stator with coil windings provided for each pole blade.

For achieving the above object the invention is characterized in that electric conductors covered with an insulating material are disposed in grooves of an end plate and respectively connected to ends of coil windings of the same phase. Thus, a rational stator facilitating a connecting process is provided.

That is, a connection configuration for a stator according to a first aspect of the invention pertains to a stator including a stator core formed of coil windings provided for each pole blade, and comprises coil windings provided for each pole blade and grouped into respective phases, electric conductors covered with an insulating material and worked into a bent form, and an end plate formed with grooves for fittedly receiving the aforesaid electric conductors, wherein the end plate is disposed on the coil windings and adapted to fittedly receive the electric conductors in the grooves thereof and the electric conductors are connected to the coil windings grouped into the respective phases.

Thus, the insulated electric conductor according to the invention may be readily obtained by bending a covered wire such as a polyurethane copper wire. Since the electric conductors are fitted in the grooves formed in the end plate, positioning of the electric conductors is facilitated so that the coil windings may be readily connected to the electric conductors by means of crimping or the like.

A connection configuration for a stator according to a second aspect of the invention is characterized in that the electric conductors are fixed in the grooves of the end plate.

Since the electric conductors are fixed in the respective grooves of the end plate, an operation for connecting the coil windings to the electric conductors is facilitated.

A connection configuration for a stator according to a third aspect of the invention is characterized in that the electric conductor has a projection projecting outward and overlapping with an end of the coil winding for connection therebetween.

Since the connection is formed by way of overlapping the projection of the electric conductor and the end of the coil winding the connected portion may have a greater contact area, thereby increasing stability. This leads to an easy connecting operation.

A connection configuration for stator according to a fourth aspect of the invention is characterized in that the electric conductors have leads representing the respective phases of the coil windings and extended out of an outer diameter of the stator.

Owing to the provision of the leads representing the respective phases of the coil windings and extended out of the outer diameter of the stator, direct connection with other peripheral equipments becomes possible, and a quantity of wiring material to be used and the number of steps for the connecting process can be reduced.

DESCRIPTION OF PREFERRED EMBODIMENTS

Preferred embodiments of the invention will hereinbelow be described with reference to the accompanying drawings.

Figure 1:
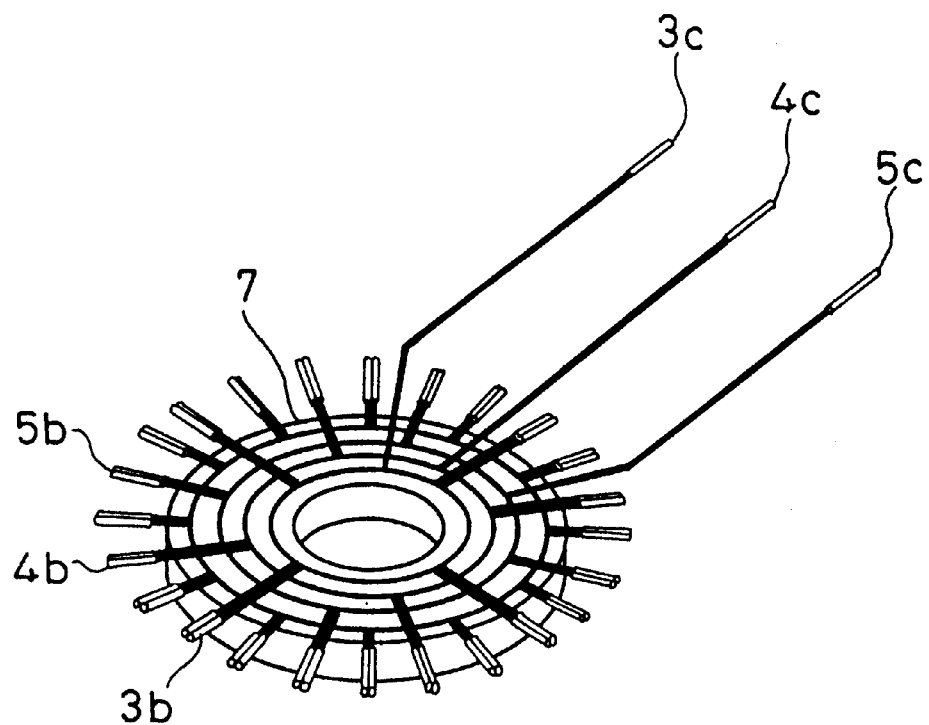
FIG. 1 is an exploded perspective view showing a stator according to one embodiment of the invention.
Figure 1:
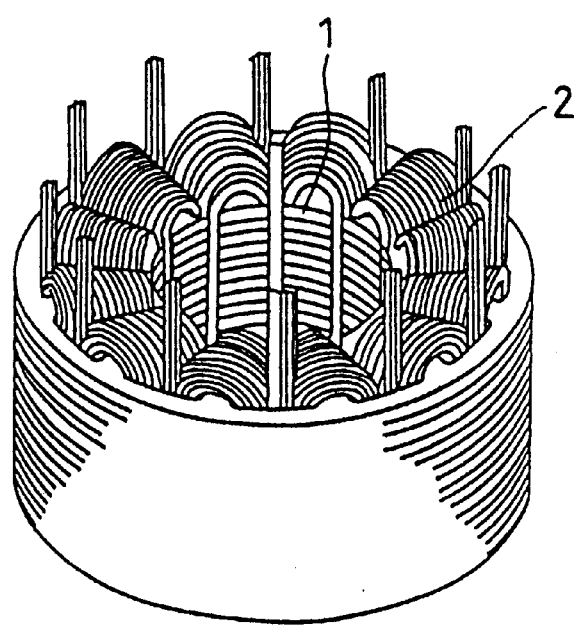
Figure 2:
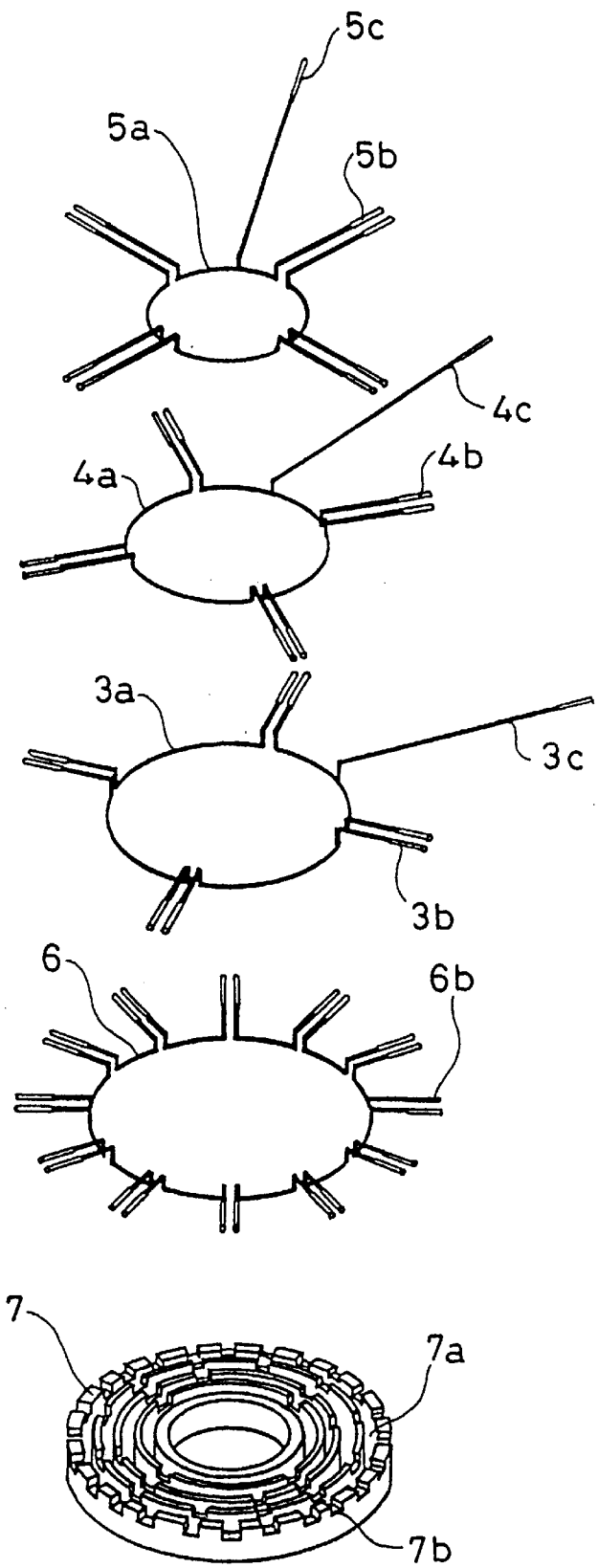
FIG. 2 is an exploded perspective view showing electric conductors and an end plate.
Figure 4:
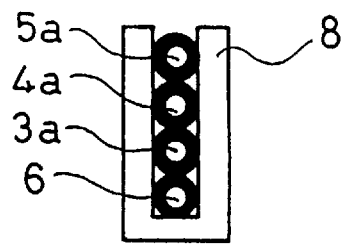
FIG. 4 is a sectional view showing an end plate according to another embodiment of the invention.
Figure 5:
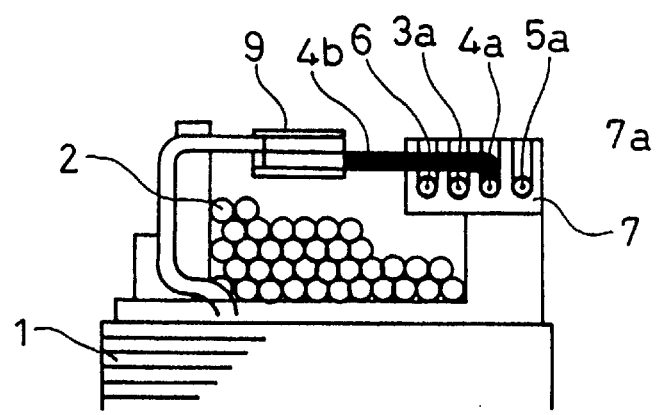
FIG. 5 is a sectional view showing a connected portion.

Referring to FIGS. 1 and 5, indicated by 1 is a pole blade of a stator core and by 2 is a coil winding around the pole blade. In FIG. 2 reference numerals 3*a*, 4*a* and 5*a* each denote an electric conductor connected to the coil winding reference numerals 3b, 4b and 5b each denote a projection provided at each electric conductor, and reference numerals 3c, 4c and 5c each denote a lead provided at each electric conductor. Indicated by 6 is a common electric conductor and by 6b is a projection provided at the common electric conductor. A reference numeral 7 denotes an end plate for housing the electric conductors and reference numerals 7a and 7b denote grooves formed in the end plate for receiving the electric conductors. In FIG. 4, a reference numeral 8 denotes an end plate according to another embodiment of the invention.

Now returning to FIG. 1, the stator has twelve separate pole blades, each being provided with the coil winding 2 therearound before being fixed in place. The stator is adapted to correspond to a three-phase structure including a U-phasee a V-phase and a W-phase and arranged such that the twelve pole blades 1 are disposed circumferentially of the stator at regular intervals and provided with coil windings corresponding to the U-, V- and W-phase in this circumferential order. That is, four pole blades provided with coil windings corresponding to the same one phase of the three phases are separately arranged circumferentially at regular intervals of every three pole blades.

The four coil windings 2 of the same phase, the U-phase for example, fitted around the respective pole blades have their respective leading ends connected to the conductor 3a. Likewise, the leading ends of the coil windings of the V-phase are connected to the conductor 4a and the leading ends of those of the W-phase are connected to the conductor 5a. On the other hand, the opposite ends or trailing ends of the twelve coil windings are connected to one common conductor 6, thus establishing the Y-configured connection of the coil windings of the U-, V- and W-phases. More specifically, the three types of conductors 3a, 4a and 5a corresponding to the U-, V- and W-phases and the common conductor 6 are concentrically arranged on the end plate 7, having their respective connected portions radially arranged in grooves 7b of the end plate 7 for connection with the respective ends of the coil windings 2.

The three types of conductors 3a, 4a and 5a and the common conductor 6 are formed of, for example, a copper wire covered with multiple insulation layers of polyimide, polyester and the like and bent in conformity with each of the grooves 7a. Examples of a usable connection method include a calking method utilizing a calking contact, a fusing method by means of resistance welding, soldering, brazing and the like.

As seen in FIG. 2, the electric conductors 3a, 4a and 5a are shaped like a ring and each correspond to four coil windings 2 of the same phase. The conductors have the projection 3b, 4b and 5b, respectively, projected outward as well as the lead 3c, 4c and 5c representing the respective phases and extending outward of an outer diameter of the stator.

The common conductor 6 is also shaped like a ring and has twelve projections 6b projected outward of its circumference and disposed at regular intervals so as to correspond to the respective pole blades 1.

The end plate 7 is formed of an insulating material such as a synthetic resin, having a donut-like shape. The end plate includes ring-like grooves 7a concentrically arranged therein for receiving the electric conductors 3a, 4a and 5a, respectively and radially arranged grooves 7b for leading out the projections 3b, 4b and 5b.

Now, description will be made on the procedure for connecting wires in the abovementioned arrangement.

Figure 3:
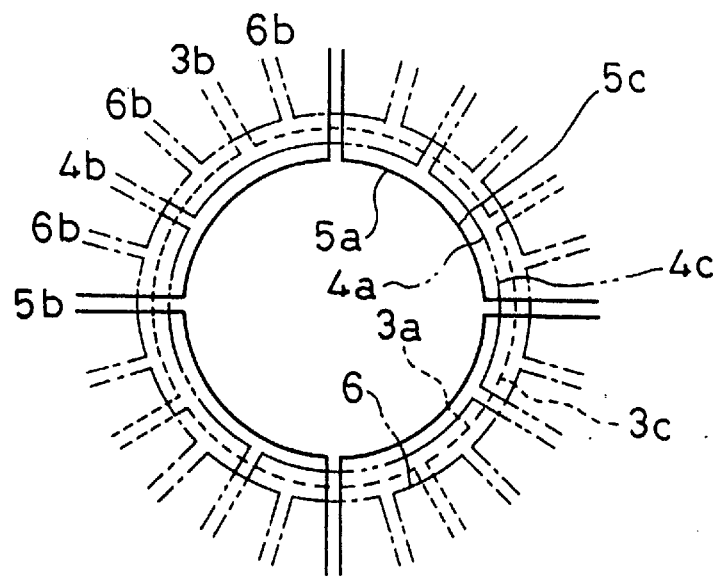
FIG. 3 is a diagram explaining an arrangement of electric conductors dedicated to respective phases and a common electric conductor.

First, the common electric conductor 6 is inserted in the outermost of the grooves 7a and the grooves 7b of the end plate 7, then the electric conductors 3a, 4a and 5a are inserted in the grooves 7a and 7b subsequently in the order of from the outer to the inner. The positional relationship among the projections 3b, 4b and 5b at this time is shown in FIG. 3. However, the positional relationship between the electric conductors 3a, 4a and 5a and the common electric conductor 6 and that among the leads 3c, 4c and 5c are not particularly specified.

Alternatively, as seen in FIG. 4 the electric conductors may be arranged in an end plate 8 in a manner according to another embodiment.

Figure 6:
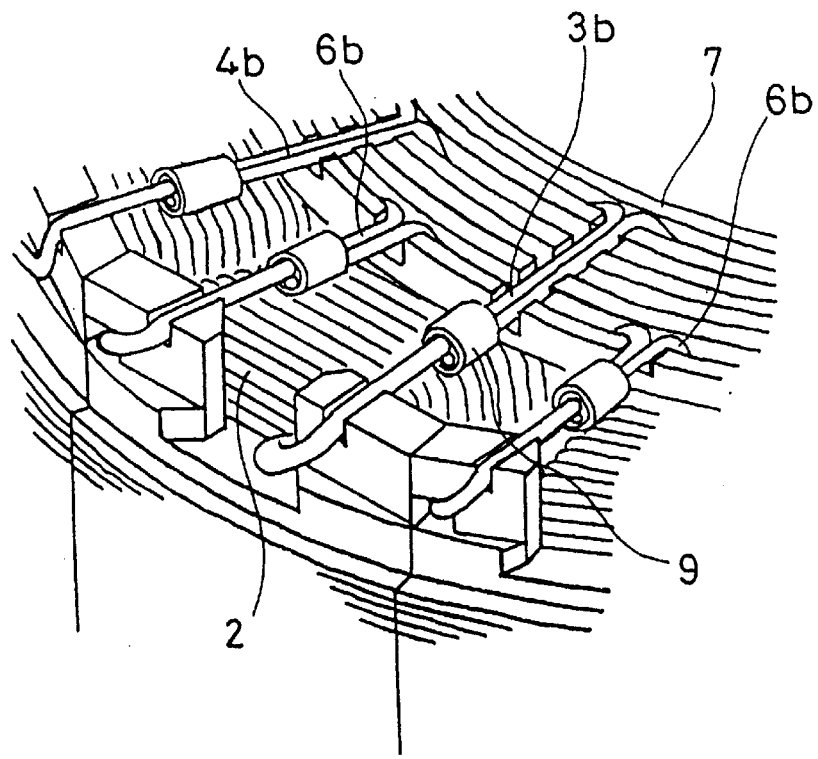
FIG. 6 is a perspective view showing a principal portion of the connected portion between an electric conductor and a coil winding.
Figure 7:
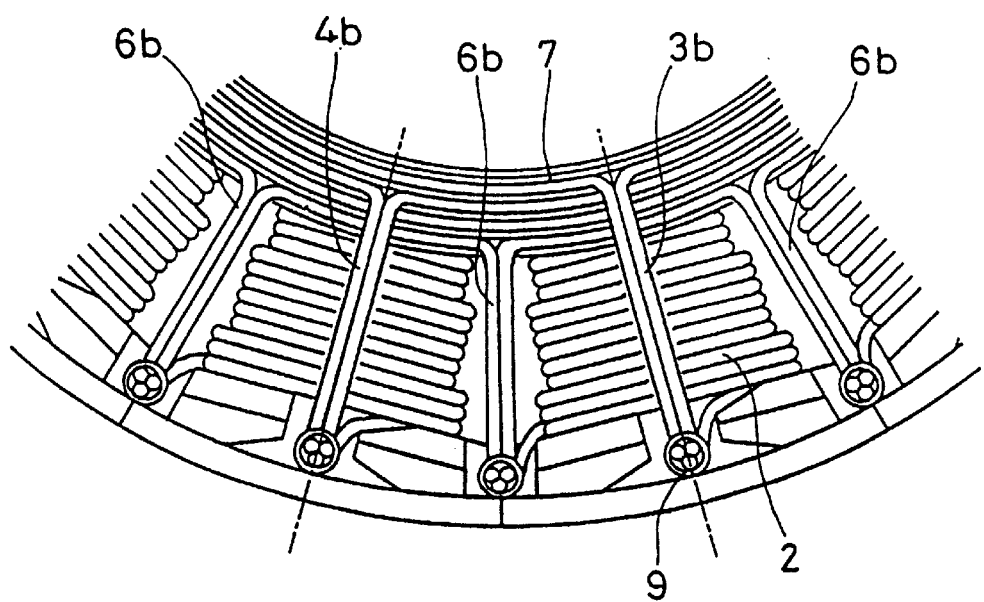
FIG. 7 is a plan view showing an example of how to house the connected portion.

Subsequently as shown in FIGS. 5 and 6 the end plate 7 is fixed onto an upper portion of the coil windings of the stator. The leading ends of the coil windings 2 are overlapped with the projections 3b, 4b and 5b, while the trailing ends of the coil windings 2 are overlapped with the projections 6b. Each overlapped portion is covered with a caulking member 9 and then caulked for establishing the connection between the coil winding and the electric conductor. Shown in FIG. 7 is an example of places for housing the connected portions. The connected portions may be homed in such a manner that the connected portions do not extend beyond the outer diameter of the stator.

If the electric conductors are inserted in the grooves of the end plate 7 or 8 and then fixed thereinto by means of resin monolithic molding, welding, bonding or the like, the subsequent connecting process may be facilitated. Although the embodiment of the invention has been described by way of an example of twelve pole blades, the embodiment may also be practiced in the same manner regardless of the number of pole blades, provided that the stator comprises three-phase coil windings.

As described above, the connection configuration of the invention is arranged such that the electric conductors 3a, 4a and 5a covered with an insulating material are provided with the projections 3b, 4b and 5b for connection with the coil windings 2, and are received in the grooves 7a and 7b of the end plate 7, thus allowing a simple equipment to accomplish the connection between the electric conductors and the coil windings 2. Furthers since the projections 3b, 4b and 5b of the electric conductors are overlapped with the respective ends of the coil windings for connection therebetween, the connecting process may be performed in a more stable manner.

Furthermore, in the connection configuration wherein the electric conductors representing the respective phases of the coil windings 2 have the leads 3c, 4c and 5c for leading respective one end thereof out of the outer diameter of the stators direct connection with other apparatuses is possible. This contributes to reduction of the wiring material to be used and of the number of steps for the connecting process.

In this result, a rational connection configuration is provided for a stator of an inner-rotor type stator, particularly of a large size, in which coil windings are provided for each pole blade.

What is claimed is:

1. A connection configuration for a stator including a stator core formed of separate coil windings provided for each pole blade, the configuration comprising:

a plurality of linearly-connected pole blades;

separate coil windings fitted around each respective pole blade prior to bending the plurality of linearly-connected pole blades into a ring-shape and before the pole blades are grouped into respective phases;

electric conductors covered with an insulating material and worked into a bent form; and an end plate having ring-shaped grooves for fittedly receiving said electric conductors;

wherein said end plate is disposed on said coil windings and adapted to fittedly receive said electric conductors in the ring-shaped grooves thereof, and said electric conductors are connected to said coil windings grouped into the respective phases.

2. A connection configuration for a stator as set forth in claim 1, wherein said electric conductors are fixed in the ring-shaped grooves of the end plate.

3. A connection configuration for a stator as set forth in claim 2, wherein said electric conductors have projections projecting outward and overlapping with one end of said coil windings for connection therebetween.

4. A connection configuration for a stator as set forth in claim 1, wherein said electric conductors have leads representing the respective phases of said coil windings and extending out of an outer diameter of the stator.

5. A connection configuration for a stator as set forth in claim 1, wherein said end plate is formed with a plurality of concentric ring-shaped grooves, each groove having a different circumference for receiving fittedly a correspondingly sized electric conductor, and said end plate having radial grooves overlapping with said concentric ring-shaped grooves.

6. A connection configuration for a stator as set forth in claim 1, wherein said electric conductors are each ring-shaped so as to be received by one of a plurality of concentric ring-shaped grooves, and in correspondence to said coil windings grouped into the respective phases, said electric conductors also have outward projections, and leads projecting outward of an outer diameter of the stator, said leads representing the respective phases, and a common electric conductor is also ring-shaped, and in correspondence to respective pole blades, has projections extending outward of its circumference.

* * * * *